Feb. 26, 1946. G. H. FRY ET AL 2,395,387
SEALING APPARATUS
Filed April 22, 1943  3 Sheets-Sheet 2

INVENTORS
GEORGE H. FRY
WILLIAM J. BECK
BY
ATTORNEY

Feb. 26, 1946.　　G. H. FRY ET AL　　2,395,387
SEALING APPARATUS
Filed April 22, 1943　　3 Sheets-Sheet 3

INVENTOR.
GEORGE H. FRY
WILLIAM J. BECK
BY
ATTORNEY

Patented Feb. 26, 1946

2,395,387

UNITED STATES PATENT OFFICE 2,395,387

SEALING APPARATUS

George Henry Fry, New Hyde Park, and William J. Beck, Yonkers, N. Y.

Application April 22, 1943, Serial No. 484,014

6 Claims. (Cl. 154—42)

This invention relates to a sealing and crimping apparatus for bags and the like.

In the devices of this type heretofore used and in which the sealing jaws are moved together by mechanical action, no protection is afforded the operator's fingers from getting caught between the pressure jaws; nor is any preliminary warning given him of their approach. Thus serious injury to the operator has often resulted from the operation of these conventional apparatus in connection with which the material to be sealed must be gripped manually.

Another obstacle in these devices is the tendency of the sealed material to adhere to the sealing jaws when they separate, thus resulting in rips and other damage.

It is therefore one object of the present invention to provide in a sealing apparatus a gripper-stripper-guard member which may be moved into engagement with the material to be sealed in advance of the sealing jaws so as to hold it in place for the sealing operation and be maintained in such position until the jaws have separated so as to strip the material therefrom.

Another object is to control the actuation of the sealing jaws by delaying the sealing movement thereof until the gripper-stripper-guard member has been moved a predetermined distance. Thus the jaws will remain stationary as long as the fingers of the operator are still between the jaws.

A further object is to provide a sealing apparatus in which the sealing jaws may be adjusted to operate in any position between the vertical and horizontal planes without moving the power plant or changing the actuating mechanisms.

In heat sealing apparatus, the heated jaw, whether made of nonferrous or ferrous metal, may become distorted when heat is applied thereto. In some of the prior constructions this problem has been solved by employing a backing member or lower jaw of rubber or similar highly resilient material. However, apart from the problem of obtaining the necessary amount of rubber for this purpose, such a jaw has to yield so as to conform to any probable distortion of the upper heated jaw and with a distorted upper jaw, there will be a differential in sealing pressure along the working surface because of the high points and low points of the distorted jaw. Inasmuch as time, heat and pressure are the essential factors of good sealing, this differential pressure is a distinct objection.

It is, therefore, an additional object of the present invention to provide a backing member or lower jaw which will cause the pressure to be distributed evenly over the entire working surface without compression of the backing member.

Other objects and advantages inherent in the invention will become apparent from the following specification taken in conjunction with the accompanying drawings, which disclose by way of example an embodiment of the invention, and in which.

Throughout the drawings the same reference characters serve to denote the same or analogous parts.

The machine according to the invention contemplates rapid and accurate timed sealing of the ends of package enclosures, such as paper bags, and cardboard boxes, preferably with heat treatment.

Referring in greater detail to the drawings, the apparatus comprises a pair of side frames 10 which are pivotally mounted on the shaft 11 which in turn is journaled in the base members 12. The latter are mounted on a table or a similar supporting surface raised above the floor.

Figure 1:
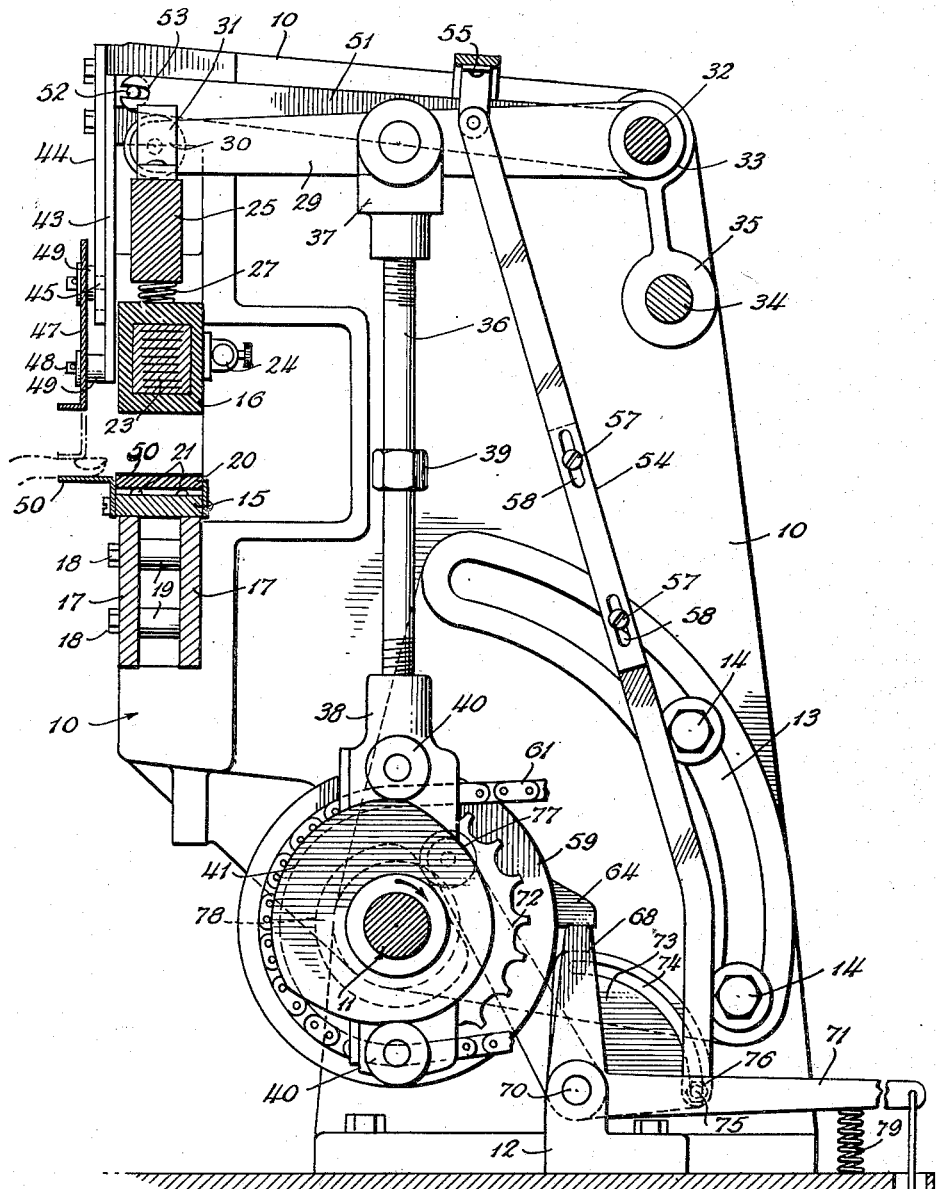
Fig. 1 is a section taken along the line 1—1 of Figure 2.

The base members 12 are provided with an arcuate slot 13 which serves as a guide-way for the bolts 14 of the side frames 10. This construction makes it possible to swing the entire frame including the entire sealing mechanism about the shaft 11 from the vertical plane in which it is shown in Figure 1 to the horizontal plane as shown in dotted lines in Figure 3. In the latter position the apparatus can be used for sealing heavy bags or packages which may be slid by a conveyor or similar machinery (not shown in the drawings) beneath the sealing mechanism.

The sealing mechanism comprises a pair of sealing jaws 15 and 16. In the embodiment shown the jaw 15 is stationary and is supported on two bars 17 which are removably mounted in a recess in the frame by means of bolts 18 and spacers 19. A platen 20 is supported on the jaw 16 by means of variable fulcrums 21. The platen is preferably made of metallic material or hard wood and should be sufficiently strong to support the material being sealed while still being flexible enough to conform to a possible distortion of the upper jaw. The platen is preferably provided with a cloth covering 22 to prevent dissipation of heat through contact of the heated jaw member with the non-heated jaw.

The jaw 16 comprises a heating element 23 which may be regulated by the control 24, and is suspended from the bar 25 by means of the straps 26 and yieldingly spaced therefrom by a series of springs 27. A pin 28 on the jaw 16 is accommodated for reciprocation in a corresponding recess in the bar 25 for the purpose of preventing lateral movement of the jaw.

Figure 2:
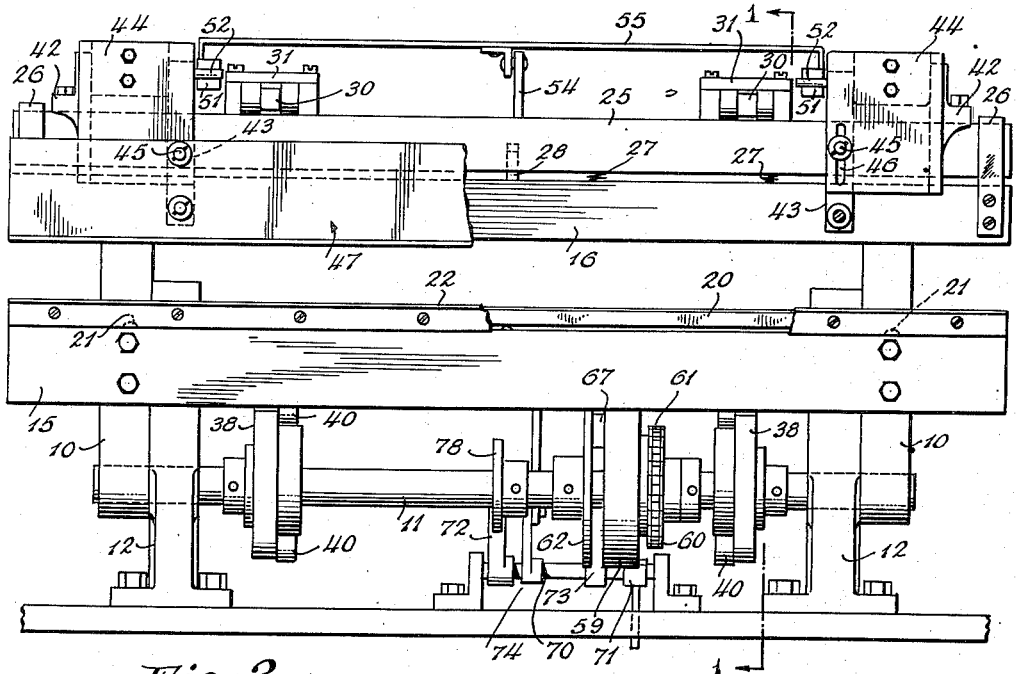
Fig. 2 is a front elevation partly in section of a sealing apparatus according to the invention.

The jaw 16 is reciprocated or moved into engagement with the jaw 15 by means of the pressure lever 29 which is provided with a roller 30 engaging in the yoke 31. As will be noted from Figure 2 of the drawings a pressure lever is provided adjacent opposite ends of the bar 25.

The pressure lever 29 is fulcrumed to fulcrum rod 32 (Figures 1 and 2) which is mounted in bearing 33 at opposite ends of the frame. A stiffening or tie rod 34 mounted in auxiliary bearings 35 is provided for purposes of re-inforcement of the fulcrum bar 32.

The pressure lever 29 together with the bar 25 and the jaw 16 are actuated by the pressure adjusting rod 36 which engages the lever yoke 37 and the cam yoke 38 by oppositely screw-threaded ends. Thus the length of the rod 36 can be adjusted and consequently the pressure of the sealing jaws by turning the fixed nut 39.

The yoke 38 is provided with a pair of cam followers 40 which engage the cam or eccentric 41 which is mounted on the shaft 11 to rotate therewith. Thus when the cam is rotated the rod 26 will be reciprocated, the high and the low surfaces on the cam representing the engaged and disengaged positions of the sealing jaws.

A pair of movable jaw guides 42 (Figure 2) is provided adjacent each end of the frame.

The gripper-stripper-guard combination comprises a pair of sliding members 43 which engage the guide-plates 44 at opposite ends of the frame by means of the pins 45 moving in slots 46 in the plates, and the strip or bar 47. The strip 47 is connected to the sliding members 43 by means of the pins 45 and the pins 48 and the spacers 49.

The lower edge of the strip 47 is preferably bent outward to provide a larger engaging surface and an apron 50 is mounted on the lower jaw 15.

The entire combination is reciprocated by means of the stripper levers 51 at opposite ends of the frame which engages the rollers 52 on the sliding members 43 by means of the recess 53 at one end and at the other end is fulcrumed to the rod 32.

The stripper levers 51 are actuated by the link 54 which is pivoted to bar 55. The link 54 may be made of two overlapping parts engaging one another by means of pins 57 and slots 58 for the purpose of adjustment. It will be understood from the foregoing that the entire gripper-stripper-guard combination can be moved independently by actuation of link 54.

The clutch mechanism controlled by the gripper-stripper-guard combination comprises a clutch 59 which is rotatably mounted on the shaft 11 and rotated by the sprocket wheel 60 and the sprocket chain 61 leading to the motor (not shown in the drawings) and the clutch disc 62 which is keyed to the shaft 11. The rotary clutch 59 is provided with a series of spaced peripheral lugs 63. A clutch dog 64 is pivoted to stud 65 of the clutch disc 62 and is so proportioned and arranged that when the clutch stop 68 is removed the tension of the spring 69 will cause the lug 66 to engage the surface 67 of the lugs 63 of the clutch.

The clutch stop 68 which normally holds the clutch dog 64 out of engagement with the clutch and thus causes the motor to idle, is keyed to the shaft 70, which is journaled in the base 12. Keyed to shaft 70 are also the stripper connecting lever 71, the clutch release lever 72 and the landing plate quadrant 73. The clutch stop 68 as well as the levers 71, 72 and the plate 73, therefore, constitute a bell crank so that actuation of one will also cause actuation of each one of the others.

The landing plate quadrant 73 is provided with an arcuate slot 74 in which engages the screw-threaded pin 75 of the link 54. The link is held in its adjusted position with respect to the landing plate by the tightening nut 76. Thus when it is desired to swing the frame from one position to another, the tightening nut 76 simply is loosened to permit the pin 75 of the link 54 to move in the slot 74, and then again is tightened in the adjusted position of the frame. It will be understood from the foregoing that the entire gripper-stripper-guard combination can be actuated by either of the levers 71 or 72.

The free end of the clutch release lever 72 is provided with a roller 77 engaging the stripper cam 78 against the tension of the spring 79 which cam is mounted on the shaft 11 for rotation therewith.

The lever 71 may be connected through a conventional link mechanism with a foot treadle (not shown in the drawings) for actuation by the operator.

In operation, the object to be sealed is placed between the jaws 15 and 16. This may be in the form of tubular structure of paper or similar material provided with a coating of adhesive, such as thermoplastic or wax so that the action of the jaws will serve to seal the opening. The foot treadle is then depressed by the operator which will cause the lever 71 to be pulled down resulting in actuation of gripper-stripper-guard 47 to cause it to engage the bag. During this operation the clutch stop 68 moves along the undersurface of the clutch dog 64 which will not be released until the latter has been cleared entirely by the stop. Therefore, the clutch will be disengaged and the jaw 16 remain stationary during this preliminary movement of the gripper-stripper-guard.

Figure 3:
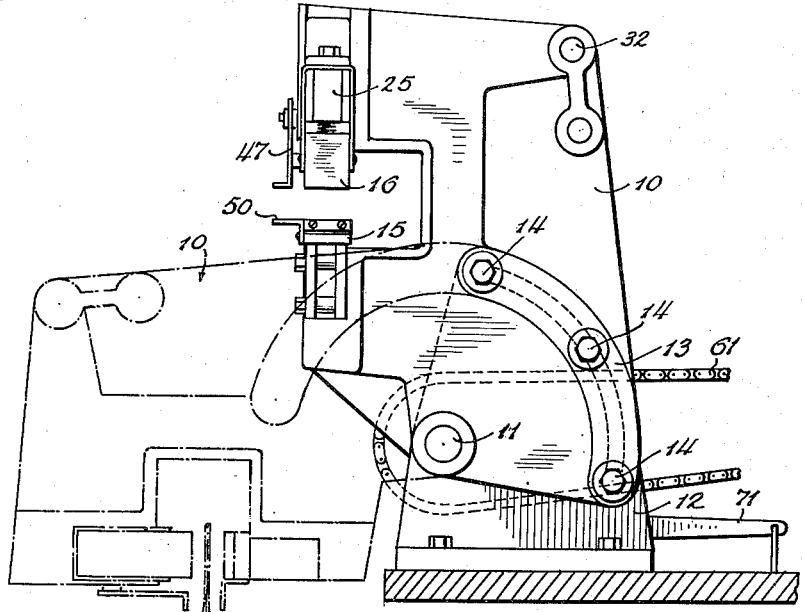
Fig. 3 is a side elevation of the sealing apparatus shown in Figure 2 showing in dotted lines the position when turned at 90°.
Figure 4:
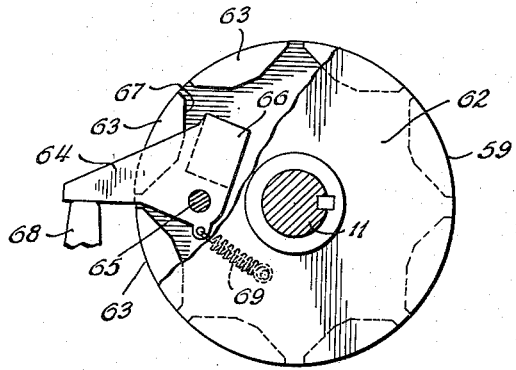
Fig. 4 is a view with a portion broken away of the clutch mechanism.
Figure 5:
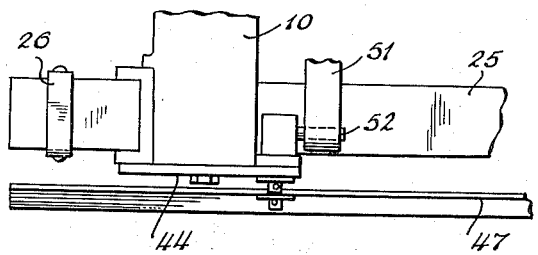
Figure 5 is an enlarged fragmentary top plan view of one end of the apparatus.

When the clutch stop has cleared the clutch dog, however, the spring 69 will cause the lug 66 to engage in one of the spaces between the lugs 63 of the clutch which results in the cams 41 and 78 to be coupled to the motor. Assuming, the cam 41 is in the position shown in Figure 1 at the commencement of the preliminary actuation of the gripper-stripper-guard, the rod 36 will be pulled downward as the cam rotates in the direction of the arrow which causes the jaw 16 to close against the jaw 15. The closing movement will be slightly delayed while the roller rides on the high surface. This length of surface corresponds to the arc in which the frame may be swung. Thus, when the frame is in horizontal position as shown in Figure 3 the roller will engage the opposite end of the high surface.

As soon as the clutch dog 64 has been released, the foot of the operator may be removed from the treadle as the high surface of the cam 78 will then engage the roller 77 of the lever 72 so as to keep the lever 71 down and the gripper-stripper-guard in closed position. It will be noted that the high surface of the cam 41 is proportionately longer than the high surface of the cam 78. Thus the jaws will have returned to its disengaged position before the lever 72 engages the low surface of the cam 78 and snaps the clutch stop back into position to disengage the clutch.

It will also be noted that the clutch cannot be engaged if the operator's fingers should be between jaws. In this manner the member 47 acts as a guard.

Although the invention has been described specifically as applicable to heat sealing apparatus, it will be understood that it lends itself to other types of sealing methods. It will also be understood that the description is not given by way of limitation but may be given various impressions within the scope of the appended claims.

What is claimed is:

1. In a sealing apparatus, a pair of oppositely disposed jaws, at least one of said jaws being movable with respect to the other jaw for engaging therebetween the material to be sealed, a reciprocable support for said movable jaw, means for reciprocating said support, said means including a rotatable shaft, a cam disc on said shaft, and a clutch mechanism for causing said cam disc to rotate with said shaft, a gripper-stripper-guard member mounted for independent reciprocation in front of said jaws and also to engage the material to be sealed, means for moving said gripper-stripper-guard member, the last mentioned means including a lever, means carried by said lever for causing engagement between said cam disc and said rotatable shaft after a predetermined movement of said lever, means for maintaining said gripper-stripper-guard member in engaged position during the engaging movement of said movable jaw and to cause return movement of said gripper-stripper-guard member after said movable jaw has been moved a predetermined distance towards its disengaged position, and also to disengage said clutch, the last mentioned means including a second cam disc on said shaft and a lever fulcrumed to the first mentioned lever operatively engaging the second cam disc and means for rotating said shaft.

2. In a sealing apparatus, a pair of oppositely disposed jaws, at least one of said jaws being movable with respect to the other jaw for engaging therebetween the material to be sealed, a reciprocable support for said movable jaw, means for reciprocating said support, said means including a rotatable shaft, a cam disc on said shaft, and a clutch mechanism for causing said cam disc to rotate with said shaft, a gripper-stripper-guard member mounted for independent reciprocation in front of said jaws and also to engage the material to be sealed, means for moving said gripper-stripper-guard member, the last mentioned means including a lever, means carried by said lever for causing engagement between said cam disc and said rotatable shaft after a predetermined movement of said lever, means for maintaining said gripper-striper-guard member in engaged position during the engaging movement of said movable jaw and to cause return movement of said gripper-stripper-guard member after said movable jaw has been moved a predetermined distance towards its disengaged position and also to disengage said clutch, the last mentioned means including a second cam disc on said shaft and a lever operatively engaging the second cam disc, means for rotating said shaft and a frame carrying said jaws and said gripper-stripper-guard member, said frame being rotatable about said shaft for adjustment to various positions, and compensating means between said first mentioned lever and gripper-stripper-guard member for actuating said member in the adjusted position.

3. In a sealing apparatus, a pair of oppositely disposed relatively movable jaws for engaging therebetween the material to be sealed, a gripper-stripper-guard member mounted for independent movement in front of said jaws, means for actuating said gripper-stripper-guard member, means for actuating at least one of said jaws to move said jaws toward and away from one another, said means including a rotatable shaft, a cam disc on said shaft and a clutch mechanism for causing said cam disc to rotate with said shaft, said clutch mechanism being controlled by said gripper-stripper-guard member, actuating means to cause rotation of said cam disc only after a predetermined movement of said gripper-stripper-guard, a frame carrying said jaws and said gripper-stripper-guard mounted for rotation about said shaft, for adjustment to various positions, and compensating means for rendering said gripper-stripper-guard actuating means effective in the various adjusted positions of said frame, and means for rotating said shaft.

4. In a sealing apparatus, a pair of oppositely disposed relatively movable jaws for engaging therebetween the material to be sealed, a reciprocable support for at least one of said jaws, means for reciprocating said support to move said jaws toward and away from one another, said means including a lever, a rotatable shaft, a cam disc on said shaft and a connecting link between said cam disc and said lever, and a clutch mechanism for coupling said cam disc with said shaft, a gripper-stripper-guard member mounted for independent movement in front of said jaws, means for moving said gripper-stripper-guard member, the last mentioned means including a first lever and a second lever and connecting link between said levers, means for controlling said clutch mechanism carried by said second lever, the last mentioned means including a second cam disc on said shaft and a lever fulcrumed to said second lever and operatively connected to said second cam disc, and means for rotating said shaft.

5. In a sealing apparatus, a pair of oppositely disposed relatively movable jaws for engaging therebetween the material to be sealed, a reciprocable support for at least one of said jaws, means for reciprocating said support to move said jaws towards and away from one another, said means including a lever, a rotatable shaft, a cam disc on said shaft and a connecting link between said cam disc and said lever, and a clutch mechanism for coupling said cam disc with said shaft, a gripper-stripper-guard member mounted for independent movement in front of said jaws, means for moving said gripper-stripper-guard member, the last mentioned means including a first lever and a second lever and connecting link between said levers, means for controlling said clutch mechanism carried by said second lever, the last mentioned means including a second cam disc on said shaft and a lever fulcrumed to said second lever and operatively connected to said second cam disc, means for rotating said shaft, and a frame carrying said jaws and said gripper-stripper-guard member and their actuating means with the exception of said second lever and said clutch control means, said frame being rotatable about said shaft for adjustment to various positions, and compensating means for rendering said second lever effective to actuate said gripper-stripper-guard member and control said clutch mechanism in the various adjusted positions of said frame.

6. In a sealing apparatus, a pair of oppositely disposed jaws for clamping therebetween the material to be sealed, one of said jaws being stationary, the other one of said jaws being movable toward and away from said stationary jaw, means for moving said movable jaw, said means including a lever, a rotatable shaft, a cam disc on said shaft and a connecting rod between said cam disc and said lever; a frame for carrying said jaws and said lever, said frame being rotatable about said shaft for adjustment to various positions.

GEORGE HENRY FRY.
WM. J. BECK.